United States Patent [19]
Walton

[11] 3,975,877
[45] Aug. 24, 1976

[54] PANEL JOINING DEVICE

[76] Inventor: Donald R. Walton, 934 W. 17th St., Costa Mesa, Calif. 92627

[22] Filed: Apr. 21, 1975

[21] Appl. No.: 569,698

[52] U.S. Cl. .............................. 52/282; 52/753 J; 52/758 H; 312/111
[51] Int. Cl.² ...................... E04B 1/40; F16B 12/00
[58] Field of Search ................ 52/281, 282, 753 J, 52/758 H; 220/80, 63 R; 217/65, 69; 312/111

[56] References Cited
UNITED STATES PATENTS

| | | | |
|---|---|---|---|
| 2,456,929 | 12/1948 | Dee | 217/65 |
| 3,337,086 | 8/1967 | Jenks | 220/63 R |
| 3,381,430 | 5/1968 | Wiczer | 52/282 |
| 3,820,299 | 6/1974 | Verholt | 51/753 J |
| 3,836,217 | 9/1974 | Shiina | 312/257 R |

FOREIGN PATENTS OR APPLICATIONS

| | | | |
|---|---|---|---|
| 1,311,988 | 11/1962 | France | 52/282 |
| 430,565 | 8/1967 | Switzerland | 69/ |
| 1,081,423 | 8/1967 | United Kingdom | 52/282 |

*Primary Examiner*—James L. Ridgill, Jr.
*Attorney, Agent, or Firm*—Fulwider, Patton, Rieber, Lee & Utecht

[57] ABSTRACT

A panel joining device formed in the manner of an extrusion which in section takes the form of two intersecting planes where the longitudinal one edge of each plane includes a vertically projecting first ridge. A second ridge is formed on the opposite face of each plane, across the intersection, such that the first ridge of one plane is directed towards the second ridge projection of the second plane. The first and second ridges are furthermore disposed to engage a first and second groove respectively formed on the face and in the edge surface of a panel to be joined with a similarly grooved other panel by the joining device.

8 Claims, 11 Drawing Figures

U.S. Patent  Aug. 24, 1976  Sheet 1 of 2  3,975,877
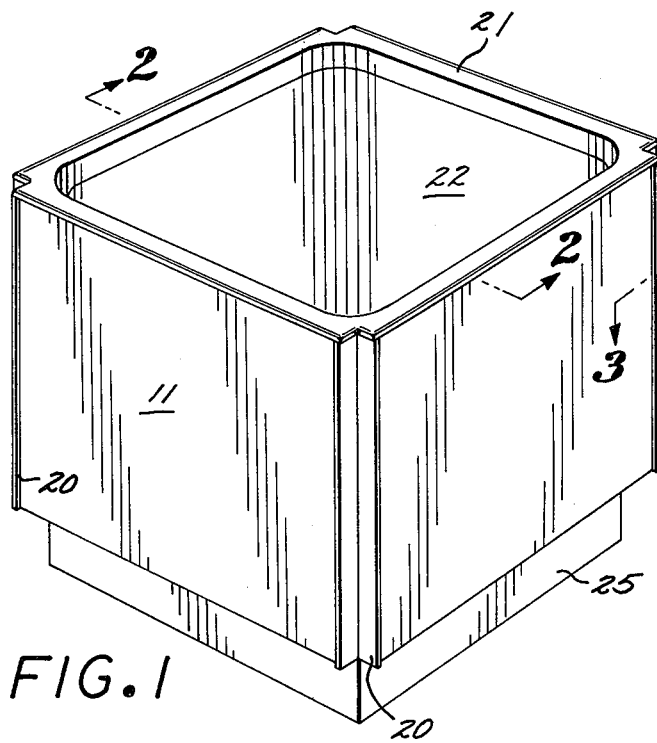
FIG. 1
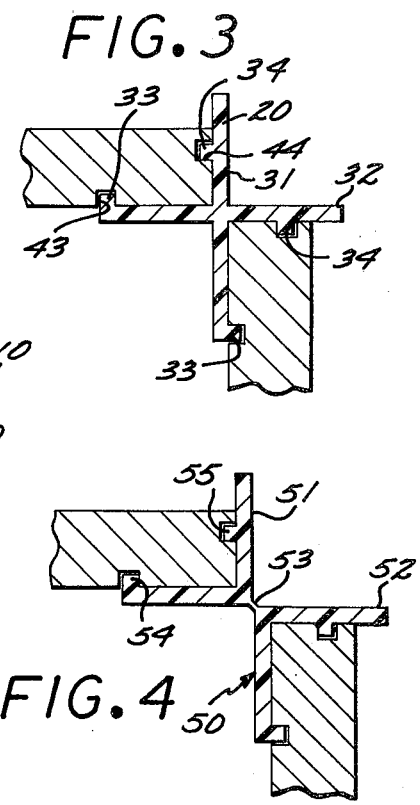
FIG. 3
FIG. 4
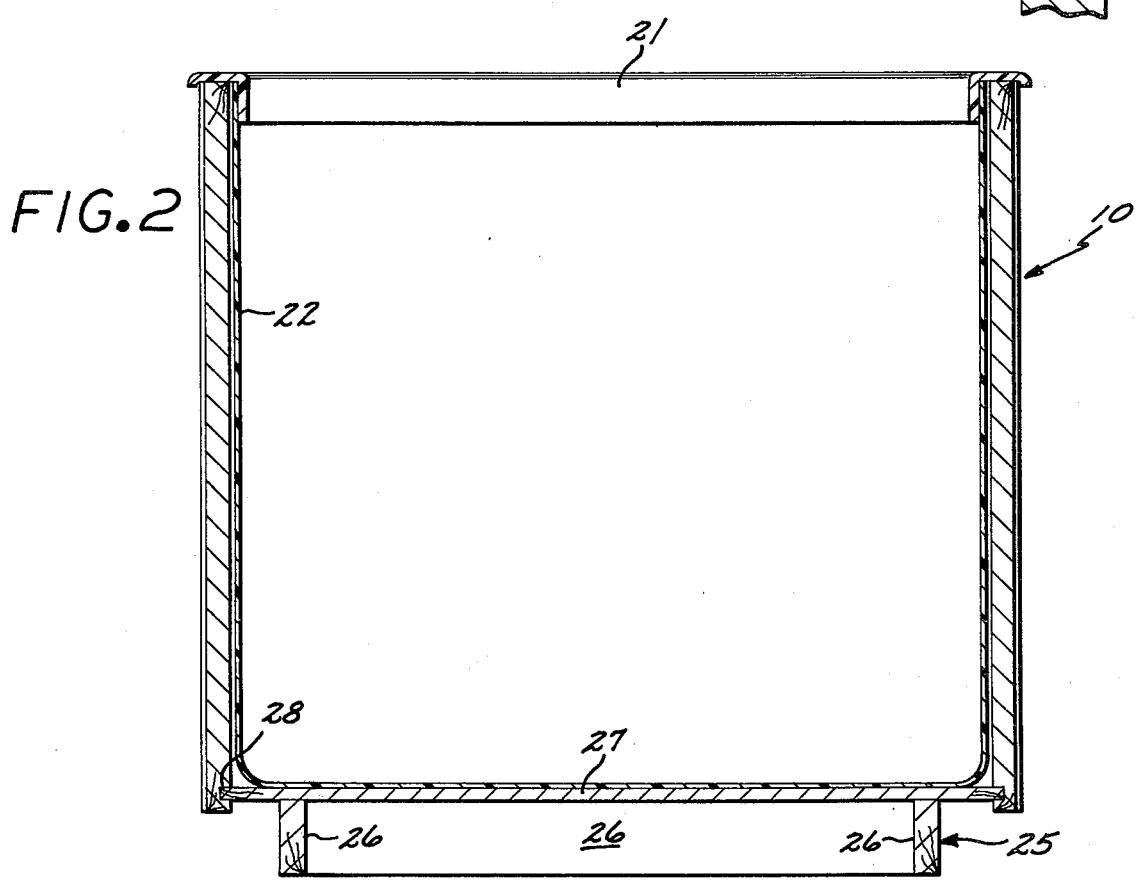
FIG. 2

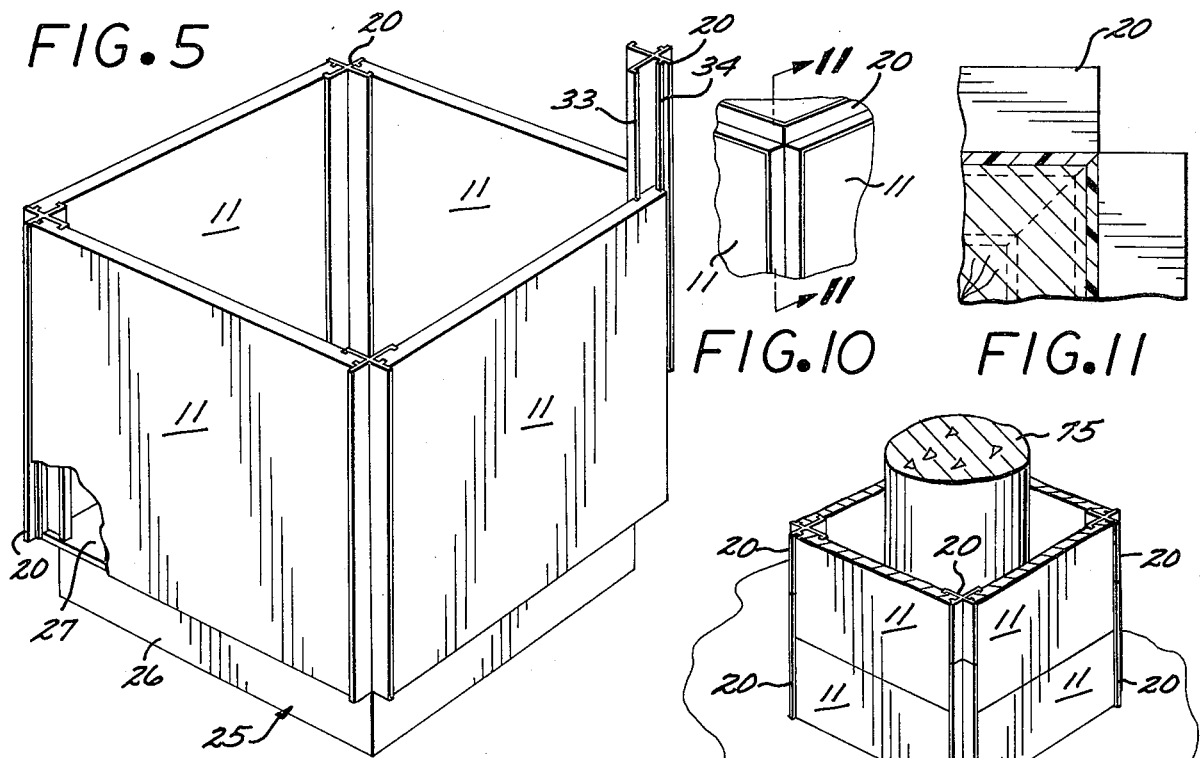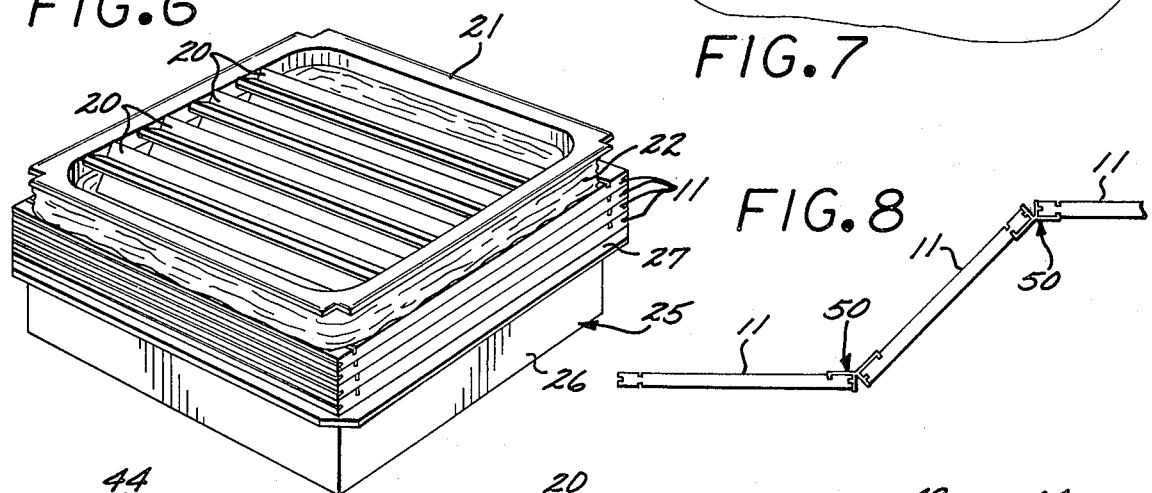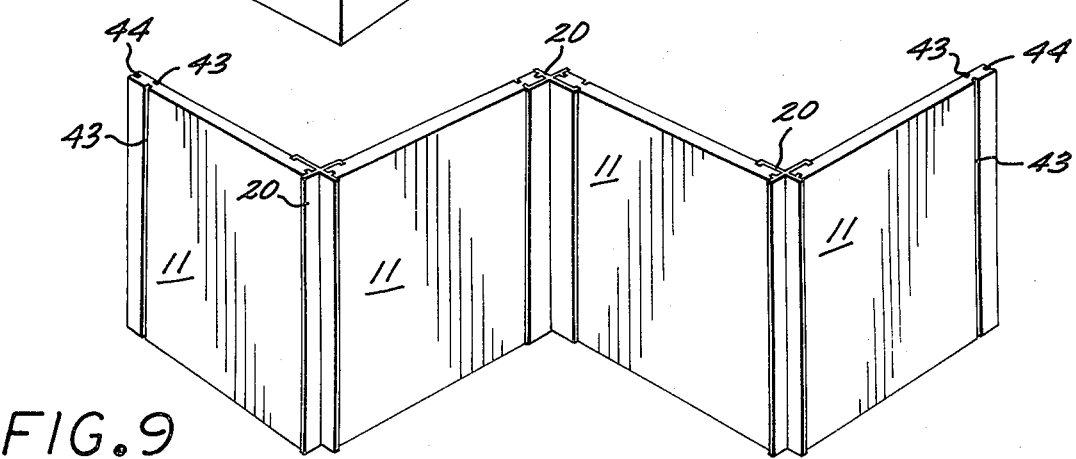

PANEL JOINING DEVICE

BACKGROUND OF THE INVENTION

1. Field of the Invention

The present invention relates to panel locks and more particularly to extruded panel joints adapted for insertion in corresponding grooves of two joining panels.

2. Description of the Prior Art

In many architectural and design applications the requirements for conveniently joining the edges of structural or ornamental panels at various angles relative to each other occurs with great frequency. In addition, many articles such as planter boxes, waste baskets, ornamental pedestals or supports are often purchased both with an eye for their structural effectiveness as well as for the artistic nuance they offer to any particular decor. In such applications either the architectural or the decor requirements often impose both color and geometric requirements which must be met by the article. Such geometric requirements are most always unique and therefore do not lend themselves to convenient prefabrication by way of an integral unit. For these reasons, the industry has offered in the past various devices for joining the lateral edges of variously textured, colored or sized panels. Most often such devices were secured to the panel by various securing devices, such as screws and bolts, such securing devices requiring both an extensive amount of labor as well as producing a visible indication of fastening which is often not desired. In addition, such prior art joining devices did not provide for a convenient manner of aligning the adjacent panels relative to each other.

SUMMARY OF THE INVENTION

Accordingly, it is the general purpose and object of the present invention to provide a panel joining device formed in the manner of an extrusion, such device including longitudinal projecting ridges receivable in corresponding grooves formed in the panel, to secure the panel along two axes of displacement. Other objects of the invention are to provide a joining device and panel combination by which various container forms can be achieved. Further objects of the invention are to provide a joining device for joining adjacent panels which allows for a convenient manner of assembly and disassembly. Yet further objects of the invention are to provide corner joining devices which allow for pivotal articulation of one panel relative the other.

Briefly, these and other objects are accomplished within the present invention by forming a joining device in manner of an extrusion of a material like plastic, such extruded joining device geometrically forming in the first embodiment two transversely intersecting longitudinal primary plane members. The longitudinal edges of the intersecting plane members furthermore include a laterally projecting longitudinal first ridge extending orthogonally from one edge of the surface of the primary plane members and a second surface ridge formed again in a longitudinal alignment, but on the face of the primary plane member and on the section distal of the intersection of the plane member from the first ridge. The corresponding first and second ridges of each plane member are aligned on opposing surfaces thereof and are furthermore thus disposed on the distal sides of the second intersecting plane member. The second projecting ridge is disposed to lie within the edge dimensions of a panel, at a position where it is received within a second groove formed in the edge surface of the panel. The panel is furthermore provided with a first groove dimensioned to receive the first ridge, such first groove being disposed on the face of the panel at a distance from the edge corresponding to the dimension of the first ridge on the intersecting plane member extending beyond the other primary plane member. In this manner, the panel is secured against transverse motion by the receipt of the second ridge within the second groove and against plan-wise motion by the receipt of the first ridge within the first groove.

In a further embodiment, the intersection of the two primary plane members may be thinned down to form an elastically deformable connecting membrane or hinge, such membrane allowing for pivotal articulation of one panel relative the other panel. Thus various angular alignments can be achieved between the corresponding panels to accommodate various shapes.

The inventive joining devices can be furthermore appropriately combined with a plurality of panels, i.e., by joining four panels, to form an open rectangular container. The bottom surface of the container in addition is closed off by a bottom panel which could be insertable by its edges into appropriate third grooves disposed on the, or along the, inside lateral edges of the side panels. In order to protect the exposed upper edges of the container, a peripheral cap or grommet may further be provided, such cap being conformed to the geometry of the upper periphery of the rectangular container, and may further include a plastic bag or liner disposed from the inner periphery thereof. Such arrangement of parts allows for the use of the rectangular container for applications like planters and similar uses where the plastic liner serves to contain liquids therein.

This arrangement of panels can be furthermore adapted for other uses such as room dividers, display boards, and the like, or for uses where structural elements of a building are to be surrounded thereby. In the last instance, the particular benefit of assembly by way of sliding insertion is most significant. In the alternative, the somewhat flexible plastic extrusion allows for assembly of a column enclosure or container when there is insufficient clearance to insert the extrusion from above. This is accomplished in the case of a square column cover by assembling all four extrusions into three panels and placing the partial cover around a column, then placing a fourth panel in place and snapping into the extrusions by means of one or two straps used like a tourniquet to force the extrusion legs into panel grooves. Furthemore, by appropriately staggering the joints between two vertically aligned panels and the vertically aligned corresponding joining devices, an integral structure can be formed which is assembled on site without the aid of tools and which furthermore can be disassembled and conveniently stored.

In addition to the foregoing description, the inventive joining devices can be used in a three dimensional configuration by appropriate trimming of the longitudinal ends thereof, as long as one surface of the container is left open for the final insertion of the last joining device.

BRIEF DESCRIPTION OF THE DRAWINGS

FIG. 1 is a perspective view of a planter box constructed according to the present invention;

FIG. 2 is a sectional view taken along line 2—2 of FIG. 1;

FIG. 3 is a sectional view of one embodiment taken along line 3—3 of FIG. 1;

FIG. 4 is a sectional view of yet another embodiment of the inventive joining device shown at the same sectional location as FIG. 3;

FIG. 5 is a perspective view in inventive cut away showing the particular assembly details of the invention planter box of FIG. 1;

FIG. 6 is a perspective view showing the planter box in a disassembled state;

FIG. 7 is a perspective view in partial cut away illustrating yet another use of the inventive panel joining device;

FIG. 8 is a top view of a room divider utilizing the inventive joining device;

FIG. 9 is yet another embodiment of a display board or a room divider utilizing the inventive panel joining devices;

FIG. 10 is a partial perspective illustration in partial cut away of a manner of assembly of three panels in three orthogonal planes, utilizing the inventive panel joining devices; and FIG. 11 is a sectional veiw taken along line 11—11 of FIG. 10.

DESCRIPTION OF THE SPECIFIC EMBODIMENTS

While the present description of the inventive panel joint is made by reference to selective examples of panel arrangements, such selection is for purposes of description only and no intent to limit the scope of use and application of the present invention is intended thereby.

As shown in FIG. 1, one particular arrangement which can be achieved by use of the inventive panel joint devices is a planter box generally designated by the numeral 10. Planter box 10 comprises four rectangular panels respectively designated 11 arranged as the vertical walls of the cube and joined at vertical adjacent edges by an inventive panel joining device 20, such device to be described in detail hereinbelow.

The peripheral edge about the top opening of the planter box is capped by a conformed plastic peripheral cap or grommet 21 which on the interior periphery is attached to the peripheral edge of the opening of a flexible liner or plastic bag 22. The assembled planter box 10 further includes at the bottom surface and projecting downwardly therefrom a base structure 25, again rectangular in planform and dimensionally limited to a size smaller than the exterior dimensions of the planter box. As shown in FIG. 2, the base structure includes a rectangularly arranged set of sideboards 26 joined at the corners, sideboards 26 being attached at the upper edges thereof to a horizontal bottom panel 27. Panel 27 is again rectangular in planform and is sized to the interior dimensions of the planter box 10. The peripheral edges of the horizontal bottom panel 27 are received within corresponding grooves 28 formed on the interior and along the bottom edges of the panels 11. The dimensions of the liner 22 furthermore allow expansion thereof under the weight of any articles or liquids contained in the planter box to conform to the interior dimensions of the box 10. In order to provide a clean edge at the interior peripheral surface of grommet 21, the peripheral edge forming the opening in the liner 22 is attached to the grommet 21 within the interspace between the peripheral edge of grommet 21 and the inner surface of the side panels 11 which is capped by such grommet.

Such assembly offers great convenience in storage, particularly as illustrated in FIG. 6, whereby the side panels 11 may be stacked on top of the bottom panel following which the bag 22 is folded thereon, bag 22 receiving the inventive joining devices 20.

As shwon in FIG. 3, the inventive joining device 20 is formed in a manner of an extrusion having the cross-sectional geometry of two intersecting primary plane members 31 and 32, plane members 31 and 32 each including a first ridge or turned lip 33 extending along one longitudinal edge thereof. Primary members 31 and 32 further include a second set of ridges 34 arranged on the face of the corresponding plane members and extending longitudinally therealong. Ridges 34 lie on the opposite sides of ridge 33 of one plane member and are directed towards the projection of ridge 33 of the other plane member. Ridges 34 are furthermore geometrically located across the intersecting plane member from the corresponding ridge 33 to lie within the edge thickness of panel 11 when such panel is laid flush against the corresponding plane member.

In order to secure the panel 11 to the ridges 33 and 34, grooves 43 and 44 are respectively formed on the face of the panel and in the edge surface thereof. It is to be noted that the grooves 43 and 44 are similarly dimensioned to locate the corresponding panels 11 within the corners formed in the intersection of plane members 31 and 32. Thus, the panel is secured against lateral withdrawal by the engagement of groove 43 with ridge 33 and against transverse translation by the engagement of the groove 44 with ridge 34.

In order to form a right angle corner, the direction of projection of ridges 33 is towards the exterior of the planter box 10 from the interior longitudinal edges of the intersecting primary plane members 31 and 32. Plane members 31 and 32 intersect at substantially right angles with the resulting alignment of panels 11 at right angles relative to each other.

Yet another embodiment of the inventive panel joining device is shown in FIG. 4. In this Figure, a joining device 50 is shown, where the prior description of intersecting plane members is modified to an extruded section comprising two L-sections 51 and 52 joined in common at the exterior vertices by a thin web 53. When such extrusions are made from some particular plastics, the thin web 53 joining the two L-sections 51 and 52 permits flexure thereacross to allow for various angular alignments of the joined panels 11. This web or hinge also allows for panels to be folded flat for storage or transporting in the manner of a folding screen. Similar to the extrusion of FIG. 3, the respective L-sections 51 and 52 include an end ridge 54 and a centrally located ridge 55 which engage the corresponding grooves 43 and 44 of the panel.

As illustrated in FIG. 5, the other vertical edges of the individual panels 11 forming the rectangular container are similarly engaged in corresponding other panel joining devices 20 to thus restrict pivotal articulation thereof and to assure a positive interlock. Furthermore, in order to achieve clearance between the horizontal bottom panel 27 and the interiorly projecting sections of the joining devices 20, the interior legs of the primary plane members 31 and 32 are cut off above the longitudinal exterior dimension of the panels, to thus clear the intersecting bottom panel 27. In order to further assure clearance, the intersecting bottom panel 27, as shown in FIG. 6, is trimmed at a 45° cut-off on each corner.

Yet a further treatment of a corner is shown in FIGS. 10 and 11 wherein panels 11 along three orthogonal planes are joined by the inventive joining devices. Again in this instance, the joining devices are necessarily trimmed along 45° cuts to join along three orthogonal axes.

By way of the illustration of FIG. 7, a particular adaptation of the inventive panel joining technique is set forth. In this illustration, the horizontal panel edges on the vertical panel dimensions and the vertical dimensions or longitudinal dimensions of the joining devices 20 are unequal in order to produce a staggered effect. The result of this arrangement is to allow successive stacking of panels around a structural element, like a column 75, to achieve any desired decorative effect around the structure which previously was not designed with any decor in mind. Similarly, in FIGS. 8 and 9 a panel arrangement is shown by way of which either a room divider or a display arrangement can be achieved. In FIG. 8, in order to permit some flexibility in arrangement, the panel 11 joined by the inventive joining devices 50 is grooved with grooves 43 on both surfaces thereof. A similar arrangement, but fixed in angular relationship, can be achieved as shown in FIG. 9, and when combined with selected joining members 50 illustrated in FIG. 4 further angular adjustment can be achieved by the flexure of the web 53.

The operation of th present invention will now be set forth with particular reference to FIG. 5 and with additional reference to the other figures of the disclosure. Specifically, as shown in FIG. 5, the joining device 20 is insertable longitudinally into the corresponding grooves 43 and 44 of the two adjacent panels 11. The insertion stroke is terminated when the cutaway edge of the interiorly projecting sections of the extrusions are brought against the bottom panel 27 which in turn is received in the peripheral grooves 28. A similar method of assembly is used for all the other configurations, each case calling for a longitudinal insertion of the joining device with the panel located at the desired angle. Once the final joint is made, the panels are then restricted along both pivotal degrees of freedom and axial degrees of freedom to form an integral structure capable of carrying loads or capable of containing various materials. To protect the exposed edges of the panels and to further enhance the appearance thereof in those instances where the panels are joined to form a container, the grommet 21 is installed, such grommet 21 being further attached at the interior peripheral margins to the upper edge portion of a liner 22 or other device for allowing storage of fluids therein. The foregoing is accomplished in short time without the use of adhesives, hardware or tools.

Some of the many advantages of the present invention should now be readily apparent. As disclosed, the invention provides a convenient manner of assembly of various structures while at the same time allowing for convenient techniques of assembly and disassembly and a convenient manner of storage and ease and economy of transportation. In addition, the inventive joining device provides covering of the exposed vertical edges of the panel, thus hiding from view the often undesirable exposure of the cut edge. Furthermore, since no fastening devices are involved in this technique of assembly, the panel surface may be variously finished or decorated to accommodate any desired interior decor and to allow for convenient renovation or change while structure is in disassembled condition.

Obviously, many modifications and variations of the present invention may be made with regard to the foregoing detailed description without departing from the spirit of the invention.

I claim:
1. Apparatus comprising:
   two adjacent panels both having expansive parallel interior and exterior faces and perpendicular edge surfaces extending therebetween at the peripheries thereof and including a first groove formed in an interior face of each panel along one edge thereof and a second groove formed in an adjacent edge surace and extending perpendicular to said first groove; and
   an extrusion formed having a cross sectional configuration of two intesecting perpendicular planes, each plane including a first ridge formed to project in a first direction and parallel to the other plane and a second ridge disposed on each of said planes distal to said first ridge across the intersection of said planes to project in a second direction therefrom parallel to the other plane, whereby said first direction from each plane is perpendicular to said second direction from the other plane, and said first and second grooves of each of said panels respectively engage said first and second ridges of a plane in the corner between the interior face and the adjacent edge surface of a panel and are received within the intersection of said planes.
2. Apparatus according to claim 1 wherein:
   said two planes intersect at right angles; and
   said first and second directions from each plane are opposed.
3. Apparatus according to claim 1 wherein:
   said first and second grooves and said first and second ridges are substantially parallel.
4. Apparatus according to claim 3 wherein:
   said extrusion is made of a plastic material.
5. Apparatus according to claim 4 wherein:
   the intersection of said planes said extrusion includes a thinned down longitudinal section to permit flexure thereof.
6. Apparatus according to claim 1 wherein:
   a plurality of said panels are joined by a corresponding plurality of said extrusions to form a peripherally closed structure.
7. Apparatus according to claim 6 further characterized in that:
   said panels include a third groove arranged orthogonal to said first groove in said interior faces along another edge thereof; and
   a bottom surface is received at the peripheral edges thereof in said third grooves.
8. Apparatus according to claim 7 further comprising:
   an edge grommet conformed in planform to the peripheral free edges of said panels; and
   a flexible liner attached to the interior periphery of said grommet for extending into the interior cavity formed within said peripheral structure.

* * * * *